UNITED STATES PATENT OFFICE.

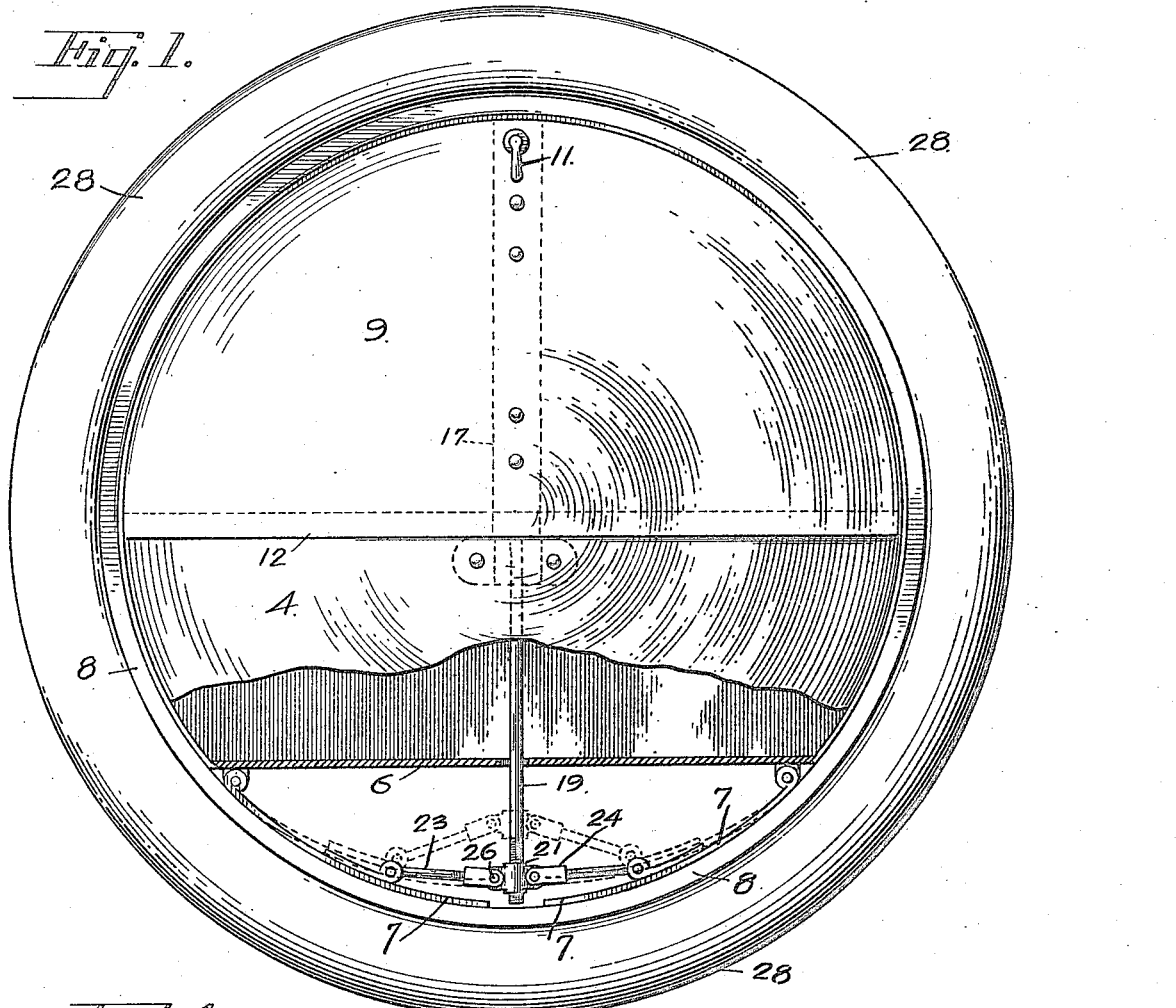
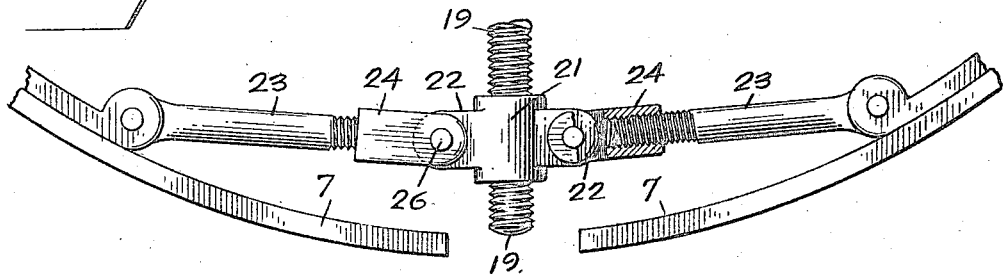

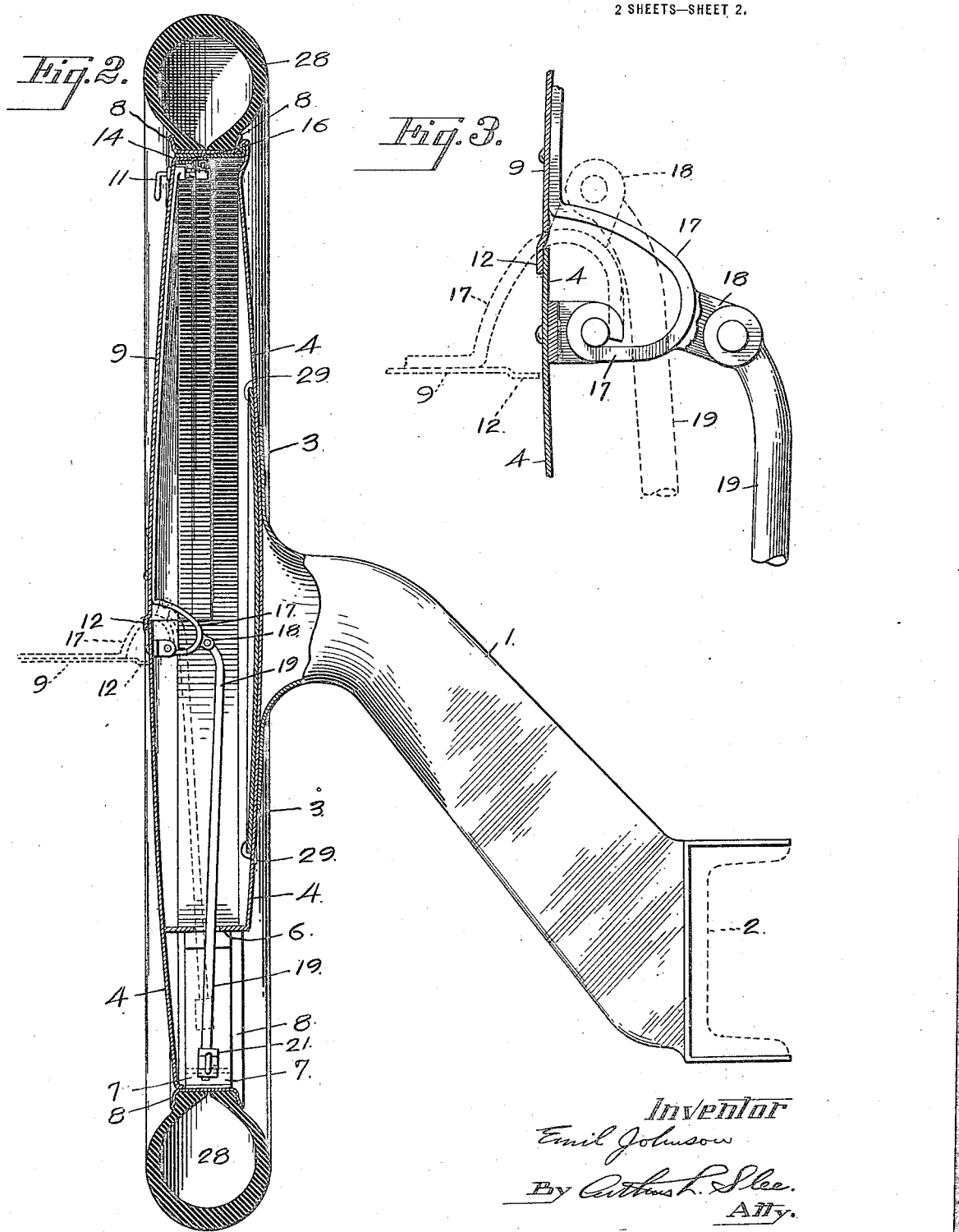

EMIL JOHNSON, OF SAN FRANCISCO, CALIFORNIA.

COMBINATION TIRE CARRIER AND TOOL BOX.

1,419,456.  Specification of Letters Patent.  Patented June 13, 1922.

Application filed May 31, 1921. Serial No. 474,036.

*To all whom it may concern:*

Be it known that I, EMIL JOHNSON, a citizen of the United States, residing in the city and county of San Francisco and State of California, have invented a new and useful Improvement in a Combination Tire Carrier and Tool Box, of which the following is a specification.

My invention relates to improvements in combination tire carriers and tool boxes wherein hinged sectors mounted upon the tool receptacle or box operate in conjunction with the cover of said receptacle to render the interior thereof accessible and to release a spare rim simultaneously.

The primary object of the present invention is to provide a new and improved tire carrier and tool receptacle for the reception of such tools as may be required for changing tires having improved means for automatically releasing the spare rim from engagement with the carrier when the cover of the tool receptacle is opened.

Another object of the invention is to provide a device of the character set forth having improved means for rendering the tire changing tools accessible and releasing the spare rim simultaneously and with one operation.

A further object of the invention is to provide a new and improved device of the character described having adjustable means for engaging the spare rim to firmly and rigidly hold the same in place.

I accomplish these and other objects by means of the improved device disclosed in the drawings forming a part of the present specification wherein like characters of reference are used to designate similar parts throughout the said specification and drawings, and in which:

Fig. 1 is a front elevation of my device partly broken away;

Fig. 2 is a vertical sectional view of the device with the supporting arm therefor shown in elevation;

Fig. 3 is an enlarged broken detailed view disclosing the manner in which the rim engaging means is operatively connected to the cover of the tool receptacle; and Fig. 4 is an enlarged broken detailed view of the rim engaging means.

Referring to the drawings the numeral 1 is used to designate a supporting arm arranged at its lower end for engagement transversely with one frame member 2 of the chassis of a motor vehicle not shown.

The upper end of the arm 1 has an annular flange 3 formed integral therewith upon which flange 3 is mounted the inner or rear side or surface of a vertically disposed substantially circular tool receptacle 4 cut away on a horizontal line as at 6 to form a flat bottom member for the receptacle 4 and also to provide a working space for the hinged sectors 7 which are hingedly connected to the outer ends of said flat bottom piece and arranged to form a continuation of the circular periphery of the tool receptacle 4 and to engage the inner side of the lower portion of a spare rim 8 mounted upon and supported by said receptacle 4.

The receptacle 4 has a semi-circular cover 9 hingedly mounted upon the horizontal diameter of said receptacle 4 and extending upwardly and having a suitable locking device 11 mounted upon the upper portion of said cover 9 which is arranged to engage the adjacent portion of said receptacle 4. The lower or horizontal edge of the said cover 9 is provided with an outwardly offset portion 12 which overhangs the upper edge of the adjacent lower portion of said receptacle to effectively shed rain and other elements and thereby protect the contents of the said receptacle.

The cover 9 is further provided with a semi-annular flange 14 which fits within a semi-annular groove 16 in the upper semi-circular portion of the said receptacle 4 to further assist in excluding the elements.

The cover 9 is hingedly connected to the receptacle 4 by means of which is known as an invisible hinge 17 mounted upon the inner side of the said cover 9 and lower front portion of the receptacle 4, said hinge 17 being provided with an inwardly extending arm 18 from which is pivotally suspended a rod 19 having its lower end threaded to receive a nut 21 having apertured wings 22.

The hinged sectors 7 are operatively and adjustably connected to the nut 21 by means of links 23 having apertured clevises 24 screwed on the nut engaging ends, which clevises 24 are pivotally connected to the wings 22 of said nut 21 by means of suitable pins 26 passing through said apertured wings 22 and clevises 24.

In operation the spare rim 8 with its spare tire or shoe 28 is mounted and supported by the vertically disposed circular receptacle 4, when the cover 9 is open, the periphery of said receptacle 4 being arranged to easily and readily receive said rim 8.

When the cover 9 is open the position of the hinge 17 and rod 19 is uppermost as disclosed in dotted lines in Fig. 3 of the drawings. By moving the cover 9 upward to close the same the arm 18 on the hinge 17 is moved downward and consequently the rod 19 also moves downward and moves the sectors 7 to tightly and rigidly engage the lower portion of the rim 8 and press the same downwardly upon the receptacle 4 thereby effectively securing the said rim 8 against removal or vibration.

This pressure may be adjusted by removing the pins 26 and screwing the nut 21 or the clevises 24 the proper amount upon their respective threads to obtain the desired pressure of the sectors 7 upon the rim 8 when the cover 9 is closed.

To automatically release the rim 8 from rigid engagement and simultaneously render the interior of the receptacle 4 accessible, the cover 9 is opened which action will move the rod 19 upwardly and disengage the sectors 7 from said rim 8.

When the cover 9 is locked in a closed position by means of the locking or securing device 11 on the upper portion of said cover 9, the rod 19 is secured against any movement which will release the sectors 7 from the rim 8.

In order to provide an adequate and rigid support for the receptacle 4 the rear wall thereof is rigidly secured between a circular member or disc 29 and the annular flange 3 formed integral with the upper end of the arm 1. By means of this reinforcement a more rigid support is imparted to the receptacle 4 as a tire carrier and vibration of the rear substantially circular wall of the said receptacle 4 is prevented.

Having thus described my invention what I claim as new and desire to secure by Letters Patent is:

1. A combination tire carrier and tool box comprising a substantially circular receptacle arranged to carry a spare rim; hinged sectors mounted upon the periphery of said receptacle and arranged to engage said rim; a cover hingedly connected to said receptacle; and means operatively connected to said cover and to the hinged sectors and arranged to automatically disengage said sectors from the spare rim when the cover is opened.

2. A combination tire carrier and tool box comprising a substantially circular receptacle arranged to carry a spare rim; hinged sectors mounted upon said receptacle and arranged to engage the rim to retain the same upon said receptacle; a cover hingedly connected to the receptacle; and adjustable means operatively connected to the cover and sectors and arranged to automatically disengage said sectors from said rim when the cover is opened whereby said rim may be automatically loosened and the receptacle rendered accessible simultaneously.

3. A combination tire carrier and tool box comprising a substantially circular receptacle arranged to engage the inner surface of and to suspend a spare rim; hinged sectors mounted upon the lower side of said receptacle and arranged to engage the lower surface of the inner side of said rim; a cover hingedly mounted upon the receptacle; an arm projecting from the lower end of said cover; and a rod pivotally connected at its upper end to said arm and at its lower end to the hinged sectors and arranged to disengage said sectors from the rim when the cover is opened whereby said rim may be automatically disengaged when the interior of the receptacle is rendered accessible.

4. A combination tire carrier and tool box comprising a substantially circular receptacle arranged to engage the inner surface of and to suspend a spare rim; hinged sectors mounted upon the lower side of said receptacle and arranged to engage the lower surface of the inner side of said rim; a cover hingedly mounted upon the receptacle; an arm projecting from the lower end of said cover; a rod pivotally connected at its upper end to said arm and at its lower end to the hinged sectors and arranged to disengage said sectors from the rim when the cover is opened whereby said rim may be automatically disengaged when the interior of the receptacle is rendered accessible; and also arranged to move the sectors into engagement with the rim to hold the same onto the receptacle when said cover is closed.

5. A combination tire carrier and tool box comprising a substantially circular receptacle arranged to engage the inner upper surface of and thereby suspend a spare rim; hinged sectors mounted upon the lower side of the receptacle and arranged to engage and depress the inner lower side of said rim to hold the same onto said receptacle; a cover hingedly mounted upon the receptacle; and a rod pivotally connected at its upper end to the cover and adjustably and pivotally connected to the hinged sectors at its lower end and arranged to automatically disengage said sectors from said rim when said cover is opened whereby the interior of said receptacle may be rendered accessible and the rim loosened from said receptacle simultaneously.

6. A combination tire carrier and tool box comprising an arm arranged for engagement with the chassis of a motor vehicle at its lower end; a vertically disposed substantially circular receptacle mounted on the upper end of said arm and arranged to carry a spare rim; hinged sectors mounted upon the lower side of said receptacle and arranged to engage said rim to hold the same onto said receptacle; a cover hingedly mounted upon the receptacle; and means operatively connected to the hinged cover and to the sectors and arranged to disengage said sectors from said rim when said cover is opened whereby the interior of said receptacle may be rendered accessible and the rim disengaged simultaneously.

7. A combination tire carrier and tool box comprising a substantially circular vertically disposed receptacle cut away horizontally on its lower end and arranged to carry a spare rim; a pair of hinged sectors mounted upon the lower surface of said receptacle and arranged to engage said rim to hold the same onto said receptacle; a cover hingedly mounted upon said receptacle; a rod pivotally connected at its upper end to the cover and having its lower end threaded; a nut screw threaded on said lower end of the rod; and links pivotally connecting the hinged sectors with the nut whereby said sectors may be automatically disengaged from the rim when the cover is opened to render the interior of the receptacle accessible and to disengage the rim simultaneously.

In witness whereof I hereunto set my signature.

EMIL JOHNSON.